United States Patent
Xie et al.

(10) Patent No.: US 8,219,813 B2
(45) Date of Patent: Jul. 10, 2012

(54) SYSTEM AND METHOD FOR PROTECTING A PERIPHERAL DEVICE AGAINST HOT PLUG ATTACKS

(75) Inventors: WenXiang Xie, Singapore (SG); Wei Loon Ng, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 3310 days.

(21) Appl. No.: 10/146,082

(22) Filed: May 14, 2002

(65) Prior Publication Data

US 2003/0084295 A1 May 1, 2003

Related U.S. Application Data

(60) Provisional application No. 60/348,431, filed on Oct. 29, 2001.

(51) Int. Cl.
*H04L 9/00* (2006.01)
(52) U.S. Cl. ......................... 713/170; 380/262
(58) Field of Classification Search .................. 713/193, 713/170; 726/6, 8; 380/260–262
See application file for complete search history.

(56) References Cited

U.S. PATENT DOCUMENTS

| | | | |
|---|---|---|---|
| 4,724,423 A | 2/1988 | Kinoshita | |
| 4,800,590 A | 1/1989 | Vaughan | |
| 4,885,778 A * | 12/1989 | Weiss | 713/184 |
| 5,237,614 A | 8/1993 | Weiss | |
| 5,282,247 A | 1/1994 | McLean et al. | |
| 5,363,449 A | 11/1994 | Bestock | |
| 5,367,572 A | 11/1994 | Weiss | |
| 5,386,567 A | 1/1995 | Lien et al. | |
| 5,412,730 A * | 5/1995 | Jones | 380/46 |
| 5,434,562 A | 7/1995 | Reardon | |
| 5,481,611 A * | 1/1996 | Owens et al. | 713/159 |
| 5,623,637 A | 4/1997 | Jones | |
| 5,625,777 A | 4/1997 | Takahashi et al. | |
| 5,640,453 A | 6/1997 | Schuchman et al. | |
| 5,661,807 A | 8/1997 | Guski | |
| 5,703,948 A | 12/1997 | Yanovski | |
| 5,784,576 A | 7/1998 | Guthrie et al. | |
| 5,802,176 A | 9/1998 | Audebert | |

(Continued)

FOREIGN PATENT DOCUMENTS

EP  1 063 580 A2  12/2000

(Continued)

OTHER PUBLICATIONS

Official Action of Japanese Patent Application No. 2003-540770, dated Oct. 28, 2008.

(Continued)

*Primary Examiner* — Beemnet Dada
(74) *Attorney, Agent, or Firm* — Cesari & Reed, LLP; Kirk A. Cesari

(57) ABSTRACT

A method is provided for preventing a peripheral device such as an ATA disc drive, which is restricted to use with a designated host, being hot-plugged to another system after the drive is unlocked. Thus, violation of privacy of data (eg. music/video) stored on the drive through a hot-plug attack may be avoided. This is accomplished by maintaining time synchronization between the drive and its designated host so that both devices obtain the same seed from time information to generate a validation number at any time that a read/write command is issued from the host.

22 Claims, 2 Drawing Sheets

U.S. PATENT DOCUMENTS

| | | | |
|---|---|---|---|
| 5,867,686 A * | 2/1999 | Conner et al. | 711/168 |
| 5,889,866 A * | 3/1999 | Cyras et al. | 713/192 |
| 5,933,500 A | 8/1999 | Blatter et al. | |
| 6,069,953 A | 5/2000 | Kong | |
| 6,071,191 A | 6/2000 | Takeda | |
| 6,073,122 A | 6/2000 | Wool | |
| 6,088,802 A | 7/2000 | Bialick | |
| 6,111,505 A | 8/2000 | Wagener | |
| 6,128,605 A | 10/2000 | Saito et al. | |
| 6,190,257 B1 | 2/2001 | Takeda | |
| 6,236,728 B1 | 5/2001 | Marchant | |
| 6,310,956 B1 * | 10/2001 | Morito et al. | 380/201 |
| 6,314,518 B1 | 11/2001 | Linnartz | |
| 6,735,310 B1 * | 5/2004 | Hsing et al. | 380/28 |
| 6,865,675 B1 * | 3/2005 | Epstein | 713/176 |

FOREIGN PATENT DOCUMENTS

| | | |
|---|---|---|
| JP | A-04-163649 | 6/1992 |
| JP | A-05-250326 | 9/1993 |
| JP | 2835433 | 6/1997 |
| JP | 9153890 | 6/1997 |
| JP | A-11-353049 | 12/1999 |
| JP | A-2001-209614 | 8/2001 |
| JP | A-2001-256004 | 9/2001 |

OTHER PUBLICATIONS

Decision of the court of affair 2000-No. ( )-1931, Feb. 1, 2001 (http://www.courts.go.jp/hanrei/pdf/A3F7C9E726E8730149256ACA001C23B5.pdf).

* cited by examiner

SYSTEM AND METHOD FOR PROTECTING A PERIPHERAL DEVICE AGAINST HOT PLUG ATTACKS

CROSS-REFERENCE TO RELATED APPLICATION

This patent application claims priority from U.S. Provisional Application No. 60/348,431 filed on Oct. 29, 2001.

FIELD OF THE INVENTION

The present invention relates generally to protecting peripheral devices such as computer disc drives. More particularly, the present invention relates to a method for protecting a peripheral device such as a disc drive, which is restricted to use with a designated host, from being hot-plugged to another system after the device is unlocked.

BACKGROUND OF THE INVENTION

The development of consumer electronics technology explores the convergence of traditional consumer electronics such as audio, video and personal communication products with the digital worlds of the personal computer. This kind of technology allows products to interact with each other and/or may incorporate many individual products into a compact and interactive unit. For example, one typical application of such technology is a set-top box. A set-top box is a device that uses a specialized computer which translates incoming digital signals into a form suitable for viewing on a standard television set. The source of the signals may be a digital satellite or terrestrial broadcast, a cable television channel or a video-on-demand program sent down a telephone line. In the Internet realm, a set-top box is essentially a specialized computer that can "talk" to the Internet. These products may be equipped with storage devices in the form of hard disc drives so that for example, users can order TV programs or movies from cable TV companies, store them on the drive, and then play back the programs or movies from the drive whenever it is convenient. Drives applied to consumer electronics generally require that an individual drive be designated to a unique host to avoid data such as video/music being stored on the drive in a way which compromises privacy.

The term hot-plug normally refers to a procedure involving plugging in or removal of a disc drive into or from a system with the power turned on. In particular, a hot-plug attack against a disc drive means that the drive is removed from a system after it is powered up and unlocked by the system, and is then plugged into another system while keeping the drive powered up during the procedure to maintain an unlocked mode of the drive. In this manner, all data stored on the disc drive can be copied to other drives or the drive can be used with another system until it is powered down.

The issue of hot-plug attack for disc drives is difficult to address because it generally occurs after a disc drive is unlocked and existing ATA (Advanced Technology Attachment) standard security features cannot protect disc drives against such attacks.

However, hot-plug attacks may still take place successfully during the interval between Security Unlock commands. So, the unlock time should be set short enough to effectively prevent hot-plug attacks. This implies that the Security Unlock command should be issued quite frequently. Thus, much of the drives time is taken up in dealing with unlock procedure in the drive's normal operations.

The present invention may provide a solution to this and other problems, and may offer other advantages over the prior art.

SUMMARY OF THE INVENTION

The present invention provides a system and method for protecting a peripheral device such as a hard disc drive against hot-plug attacks which addresses the above-mentioned problem.

The present invention may provide a method for preventing a disc drive being hot-plugged from its designated host to another system without affecting the drive's normal read/write operations. The method may effectively protect the drive from hot-plug attacks by maintaining time synchronization between the drive and its host. It may also significantly extend the interval (i.e., the unlock time limit) between Security Unlock commands by using a Features register to carry security information in each read/write command.

According to one aspect of the present invention there is provided a method of protecting a peripheral device designated to a host against hot-plug attacks, the method including the steps of:
   (a) maintaining time synchronization between the host and the peripheral device;
   (b) utilizing the time synchronization to generate common data in the host and the peripheral device; and
   (c) generating a validation code in the host based on a seed including the common data.

According to a further aspect of the present invention there is provided a system for protecting a peripheral device designated to a host against hot-plug attacks, the system including:
   (a) means for maintaining time synchronization between the host and the peripheral device;
   (b) means utilizing the time synchronization for generating common data in the host and the peripheral device; and
   (c) means for generating a validation code in the host based on a seed including the common data.

These and various other features as well as advantages which characterize the present invention will be apparent upon reading of the following detailed description and review of the associated drawings.

DETAILED DESCRIPTION

Figure 1:
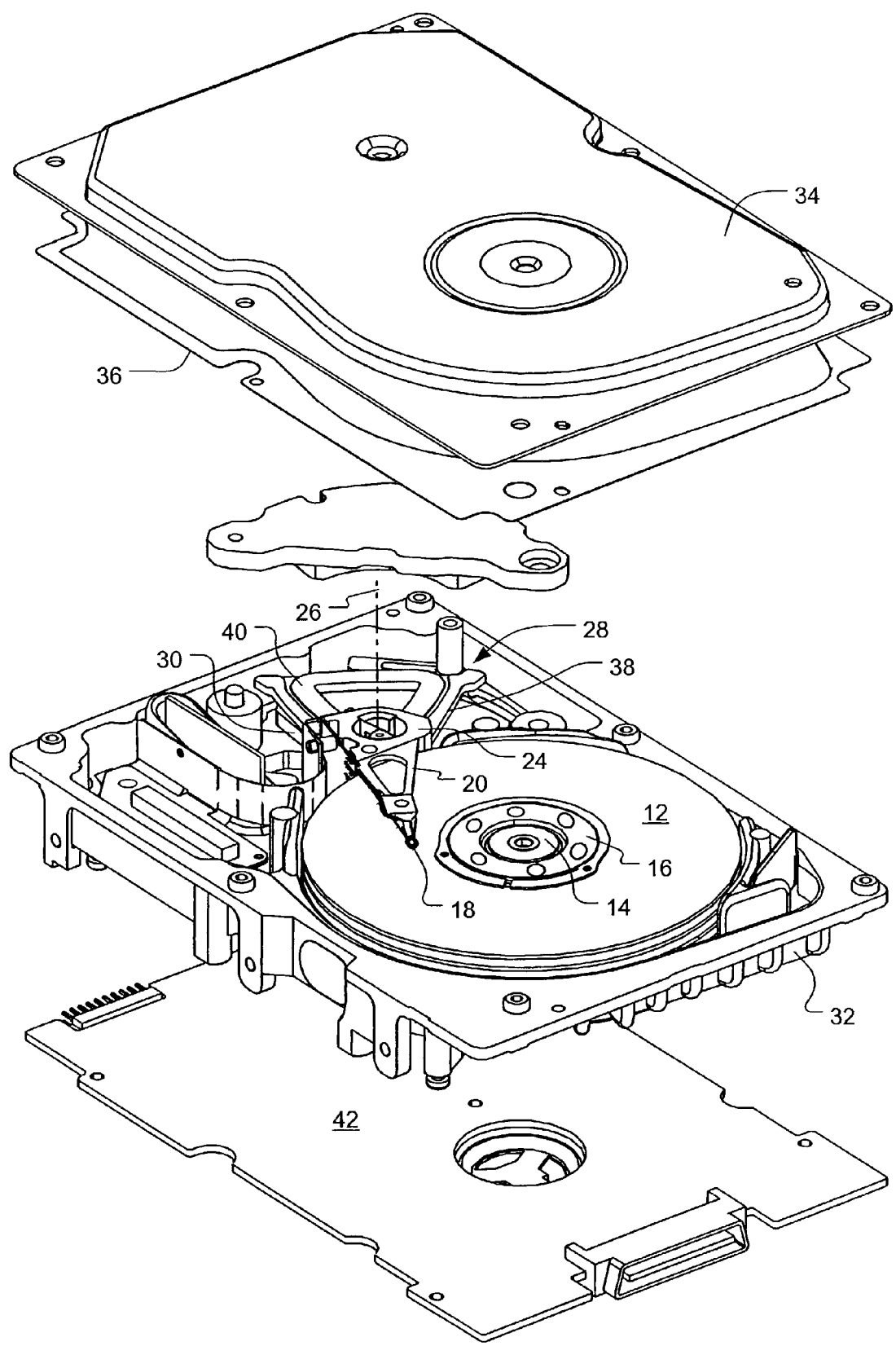
FIG. 1 shows an exploded view of a hard disc drive.

According to the ATA standard, issuing a command (control information) from a host to a disc drive can be implemented through the Features register, Sector Count register, LBA Low register, LBA Mid register, LBA High register, Device register and Command register. Because the Features register is not used for all read/write commands currently implemented in ATA disc drives, it can be used to carry security information in each read/write command. This may avoid adding overhead for the purpose of protecting a disc drive against hot-plug attacks.

The security information to be carried by the Features register may include a validation number generated based on a seed. For example, the following formula can be used for such a purpose:

$$X_{n+1} = P_1 \cdot X_n + P_2 \bmod N \quad n=0,1,2,\ldots \quad (1)$$

where $X_0$ denotes the seed. From the formula, the same seed will generate the same validation number $X_1$ if $P_1$, $P_2$ and N of the host are the same as those of the drive.

To maintain time synchronization between the host and its drive, individual timers with an initial value $T_o$, may be set between them. The content of each timer may be arranged to increment in milliseconds and may be used as a seed to generate a validation number every time that a read/write command is issued. In each subsequent unlock command, the content of the timer may be updated by adding an unlock time limit with its currently stored value, and the updated content may be stored in the host in addition to the initial value.

To illustrate the concept, the following variables are defined. Let $T_u$=the unlock time limit,
T=the stored content of the synchronization timer in the host,
$D_{max}$=the time-block unit used to eliminate the effect of timing difference between synchronization timers of host and drive on seed generation within an unlock time limit.

The timing difference is contributed from three sources:
1. Clock difference between host and drive;
2. Delay, $D_u$, between starting of synchronization timers in the host and drive;
3. Delay, $D_{rw}$, between generation of a validation number in the host and drive.

After power up, the host should send out the encrypted password to unlock the locked drive before commencing normal operations.

During unlock procedure, the host may:
1. Update and store T with $T+T_u$;
2. Encrypt $T-T_o$ and send to the drive along with an unlock password;
3. Start timing from T in milliseconds, where $T_o$ is the initial value of the synchronization timer.

Meanwhile, the drive may:
1. Obtain $T-T_o$ after decryption from the unlock command;
2. Calculate T by adding $T-T_o$ with its stored initial value $T_o$;
3. Start timing from T in milliseconds.

The purpose of transferring the difference $T-T_o$ from the host to the drive is to ensure that both start their synchronization timers from the same value in any event.

When the host issues a read/write command at T+Y, the host may:
1. generate a validation number using the quotient of $(T+Y)/D_{max}$ as the seed; and
2. place the validation number as the content of the Features register, which may be transferred to the drive along with the command via the ATA bus.

Once the drive receives the read/write command,
1. The drive may respond to the command as usual while validating the above validation number in the background:
   i. The drive may confirm the validation number stored in the Features register by generating its own validation number using the same formula as the host, based on its own timer values; and
   ii. Compare the drive's validation number with that in the Features register.
2. The drive may continue to respond normally to all host commands while the background validation process is proceeding, i.e., subsequent read/write commands with new validation numbers, may be ignored. The above validation may be completed relatively quickly, for example in 1 millisecond.
3. If the comparison between the two validation numbers fails, the drive may retry the validation procedure by incrementing/decrementing the current seed of the drive. This may address the possibility that a difference in the seed between the host and drive was caused by a minor timing discrepancy between them.
4. If retry comparison fails, the drive may switch to locked mode immediately and may reject all future read/write commands.

Before the unlock time limit expires, the host may issue an unlock command to resynchronize the synchronization timer by updating its timer with $T+T_u$ and then transfer the encrypted difference $T+T_u-T_o$ to the drive along with the command. Thus, both can start timing from the newly updated and synchronized value.

This step can avoid the timing difference accumulated since the last unlock command passed down. Hence, the unlock time limit can be set to a relatively large value. For example, it can be set to 30 or 60 minutes or even longer assuming that the timing difference between the host and the drive can be ensured to be small enough. However, for present purposes the unlock time limit may be set to approximately 30 seconds to minimize the possibility of hot-plug attacks.

The following description elaborates point (3) above on how the effect of timing discrepancies can be resolved:

Assume
$T_u$=50 minutes
$D_{max}$=20 milliseconds
$D_u$=0.6 milliseconds
$D_{rw}$=0.8 milliseconds Let the clock of the host be slower than that of drive by 0.01 milliseconds per second (during implementation, it may be required that $T_o$ and $T_u$, are multiples of $D_{max}$). Consider the following two cases:

(1) For the host, $T+T_u$=305419880 (milliseconds) and $T+T_u+Y$=305440015 (milliseconds) (i.e., after 20135 milliseconds since $T+T_u$ in the host). Then, the seed of the host at $T+T_u+Y$ is 15272000. The corresponding seed of the drive is (305440015−0.6+0.8+0.01*20.135)/20=15272000, which is equal to that of the host at $T+T_u+Y$.

(2) For the host, $T+T_u$=305419880 (milliseconds) and $T+T_u+Y$=307219888 (milliseconds) (i.e., after 1800008 milliseconds or over 30 minutes since $T+T_u$ in the host). Then, the seed of the host at $T+T_u+Y$ is 15360994. The corresponding seed of the drive is (307219888−0.6+0.8+0.01*1800.008)/20=15360995, which is bigger than that of the host at $T+T_u+Y$ by one. In this case, the drive should decrement its current seed, i.e., 15360995 to obtain a match with the validation number generated by the host based on the seed 15360994.

FIG. 1 shows a disc drive in exploded view. Briefly, the disc drive 10 includes a housing base 11 and a top cover 12, which engage a gasket 13 to form a sealed housing that maintains a clean environment therein. A plurality of disks 14 is mounted for rotation on a spindle motor hub 15. A plurality of transducer heads 16 is mounted to an actuator body 17. The actuator body 17 is adapted for pivotal motion under control of a voice coil motor (VCM) including a voice coil 18 and magnets 19 to controllably move a head 16 to a desired track 20 along an arcuate path 21. Signals used to control the VCM and the heads 16 pass via a flex circuit 22 and a connector 23 to and from electronic circuitry on controller board 24. The controller board 24 includes a fibre channel interface 25, a serial port connector 26 and a spindle connector 27.

Figure 2:
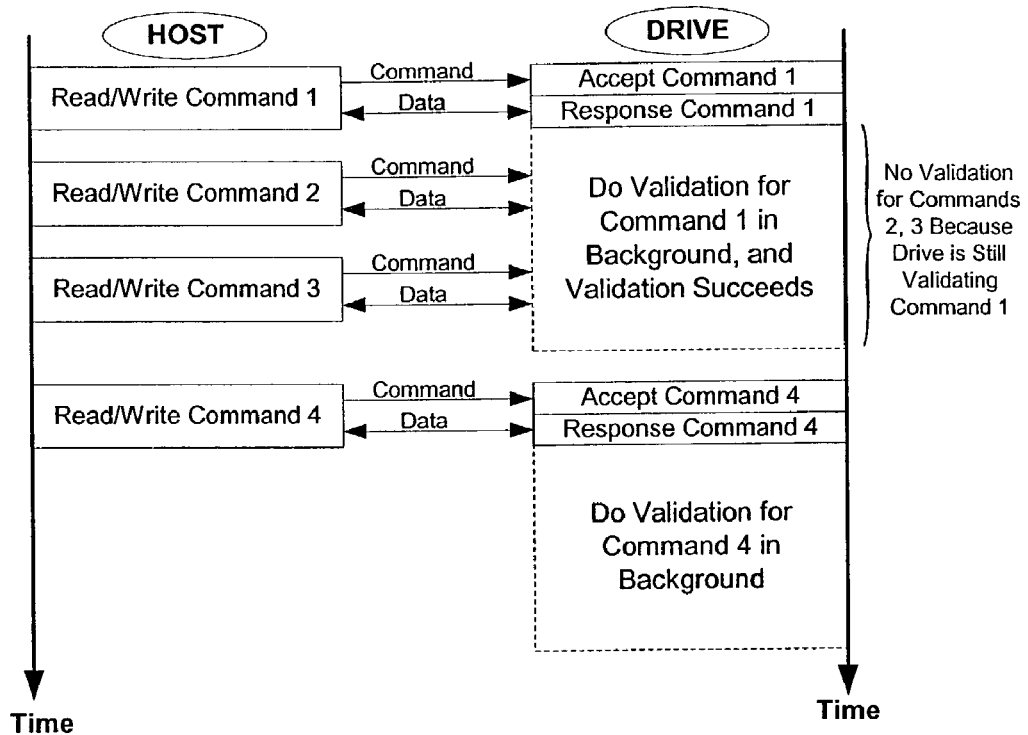
FIG. 2 is a flow chart of a communication between a host and a hard disc drive wherein a validation procedure was successful.

FIG. 2 shows a flow chart of a communication between a host and a hard disc drive. The host issues a read/write command 1 when the value of the synchronization timer is at $T+T_u+Y$. The host then generates a validation number based on the formula of equation (1) using the quotient $(T+T_u+Y)/D_{max}$ as the seed. The host places the validation number as the content of the Features register, and transfers this to the disc drive along with the command via the ATA bus.

The disc drive receives the read/write command 1 and responds to the command as usual while confirming the above validation number in the background. The drive confirms the validation number stored in the Features register by generating its own validation number based on the same formula of equation (1) as the host using the value of its own timer as the seed. The drive then compares the validation number it generates with that in the Features register. The drive continues to respond to all host commands while the background validation process is proceeding by ignoring subsequent read/write commands 2 and 3 which contain new validation numbers.

If the comparison is successful, as shown in FIG. 2, the disc drive receives read/write command 4 with a new validation number. The drive responds to the command while validating the new number in the background. Assuming that the comparison of the new number is again successful the above procedure is repeated.

Figure 3:
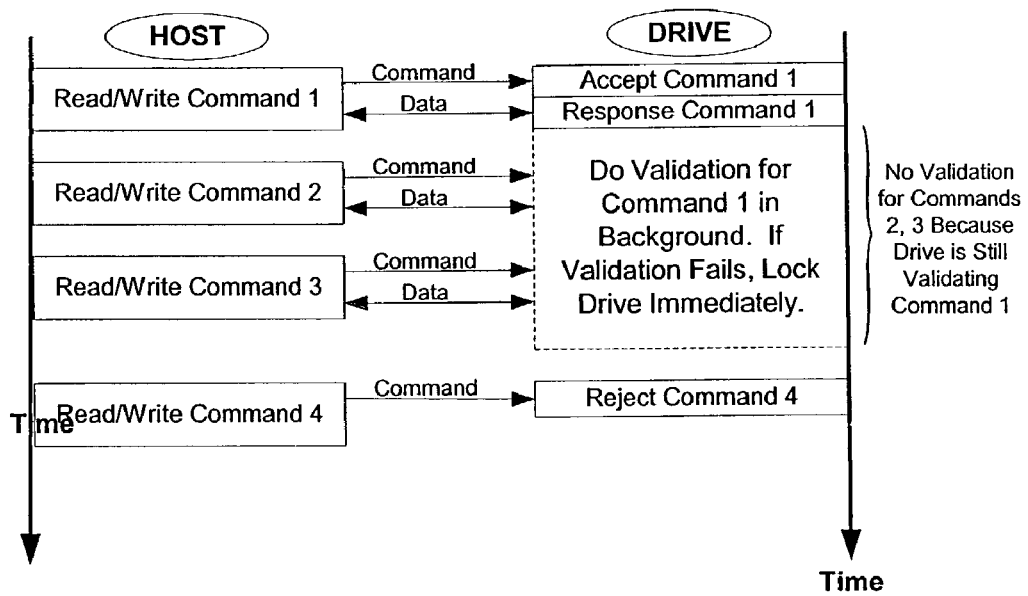
FIG. 3 is a flow chart of a communication between a host and a hard disc drive wherein a validation procedure was not successful.

If the comparison in the first instance is not successful, as shown in FIG. 3, the drive retries the validation procedure by incrementing/decrementing the current seed of the drive. This may resolve the possibility of a difference in the seed between the host and drive being caused by minor timing discrepancies between them. If the retry comparison is not successful, the drive switches to locked mode immediately and rejects read/write command 4 and subsequent read/write commands.

The present invention may prevent a disc drive designated to a host being hot-plugged to another system by maintaining time synchronization between the drive and the host after unlocking. The present invention may use the Features register in each read/write command to carry a validation number, which is generated based on the seed from time information, so that normal read/write operation commands are not affected.

In this way, the present invention may defeat the following two possibilities of attacks even though the drive is hot-plugged to another system for example, a PC. One possibility is that the contents of the Features register may be captured using an ATA bus analyzer. When the exact captured contents are sent to the drive from the PC, the timer used by the drive is now different and thus generates a different validation number. Thus the captured contents cannot be used to access the drive anymore. Exhaustive search of a valid 8-bit number is not possible because the drive switches to locked mode when there is even 1 miscomparison.

The present invention may significantly prolong the unlock time limit because:
1. It may seek to validate every read/write command.
2. Validation may be performed in the background without affecting the drive's performance.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the while maintaining substantially the same functionality without departing from the scope and spirit of the present invention. In addition, although the preferred embodiment describe herein is directed to a disc drive, it will be appreciated by those skilled in the art that the teaching of the present invention can be applied to other systems, like hard disc drive system, without departing from the scope and spirit of the present invention.

The invention claimed is:

1. A method of protecting a peripheral device designated to a host, the method comprising:
   (a) maintaining time synchronization between the host and the peripheral device by passing timing information with a first command between the host and the peripheral device;
   (b) utilizing the time synchronization to generate common data in the host and the peripheral device; and
   (c) generating a respective validation code in the host based on a seed including the common data with each of a plurality of second commands and transferring the respective validation code with each of the plurality of second commands from the host to the peripheral device.

2. A method according to claim 1 including placing the respective validation code in a register associated with the host and transferring the respective validation code to the peripheral device with each of the plurality of second commands, which comprise read or write commands.

3. A method according to claim 2 wherein the register includes a Features register.

4. A method according to claim 1 wherein the validation code includes a random number.

5. A method according to claim 4 wherein the random number is generated by means of a formula in the form $$X_{n+1}=P_1 \cdot X_n + P_2 \bmod N\; n=0,1,2,\ldots$$

wherein $X_0$ denotes the seed.

6. A method according to claim 1 wherein the time synchronization is maintained by periodically setting respective timers in the host and the peripheral device to an initial value based on the timing information.

7. A method according to claim 2 wherein the common data is transferred to the peripheral device in a manner which does not substantially affect read/write operations in the device.

8. A method according to claim 1 including generating a validation code in the peripheral device based on the common data and comparing the validation code generated in the peripheral device with the validation code generated in the host.

9. A method according to claim 8 wherein the peripheral device responds normally to commands from the host during the comparison.

10. A method according to claim 8 including generating a revised validation code when the comparison does not result in a match of the validation codes and comparing the revised validation code with the validation code generated in the host.

11. A method according to claim 8 including switching the peripheral device to a locked mode in which the peripheral device fails to respond to further commands from the host, when the comparison does not result in a match of the validation codes.

12. A system for protecting a peripheral device designated to a host, the system including:
   (a) means for maintaining time synchronization between the host and the peripheral device by passing timing information with a first command between the host and the peripheral device;
   (b) means utilizing the time synchronization for generating common data in the host and the peripheral device; and
   (c) means for generating a respective validation code in the host based on a seed including the common data with each of a plurality of second commands and transferring the respective validation code with each of the plurality of second commands from the host to the peripheral device.

13. A system according to claim 12 including means for placing the respective validation code in a register associated with the host and means for transferring the respective validation code to the peripheral device with each of the plurality of second commands, which comprise read or write commands.

14. A system according to claim 13 wherein the register includes a Features register.

15. A system according to claim 12 wherein the validation code includes a random number.

16. A system according to claim 15 wherein the random number is generated by means of a formula in the form $$X_{n+1} = P_1 \cdot X_n + P_2 \bmod N \; n=0,1,2,\ldots$$

wherein $X_0$ denotes the seed.

17. A system according to claim 12 including respective timers in the host and the peripheral device and wherein the time synchronization is maintained by periodically setting the timers to an initial value based on the timing information.

18. A system according to claim 13 wherein the common data is transferred to the peripheral device in a manner which does not substantially affect read/write operations in the device.

19. A system according to claim 12 including means for generating a validation code in the peripheral device based on the common data and means for comparing the validation code generated in the peripheral device with the validation code generated in the host.

20. A system according to claim 19 wherein the peripheral device responds normally to commands from the host during the comparison.

21. A system according to claim 19 including means for generating a revised validation code when the comparison does not result in a match of the validation codes, and means for comparing the revised validation code with the validation code generated in the host.

22. A system according to claim 19 including switching the peripheral device to a locked mode in which the peripheral device fails to respond to further commands from the host, when the comparison does not result in a match of the validation codes.

* * * * *